W. P. RUSSELL.
VENTILATING APPARATUS FOR SLEEPING CARS.
APPLICATION FILED MAY 29, 1913.
1,172,313.
Patented Feb. 22, 1916.
5 SHEETS—SHEET 3.
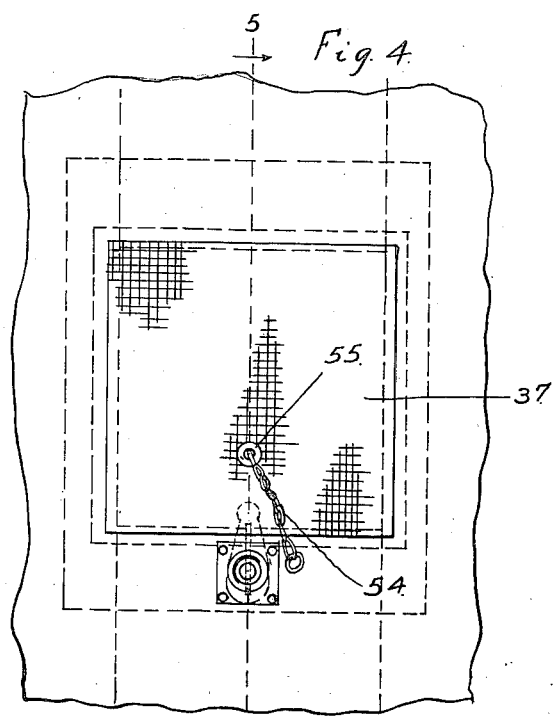
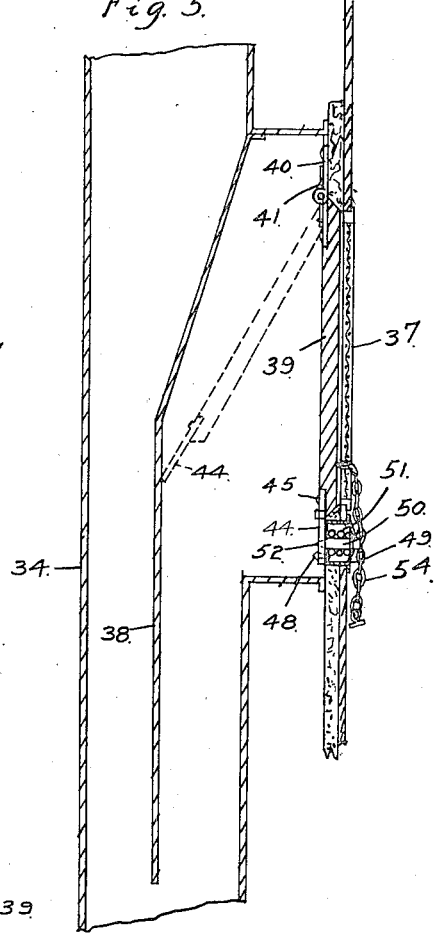
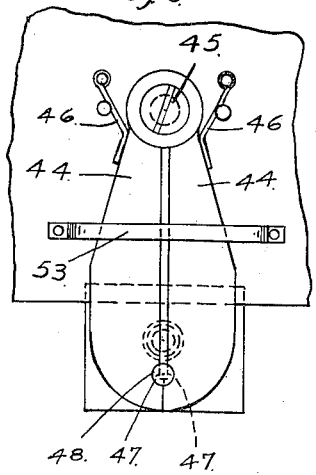
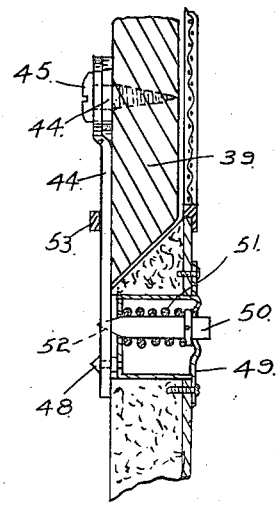
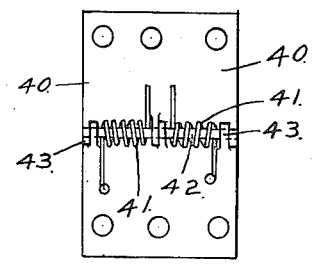

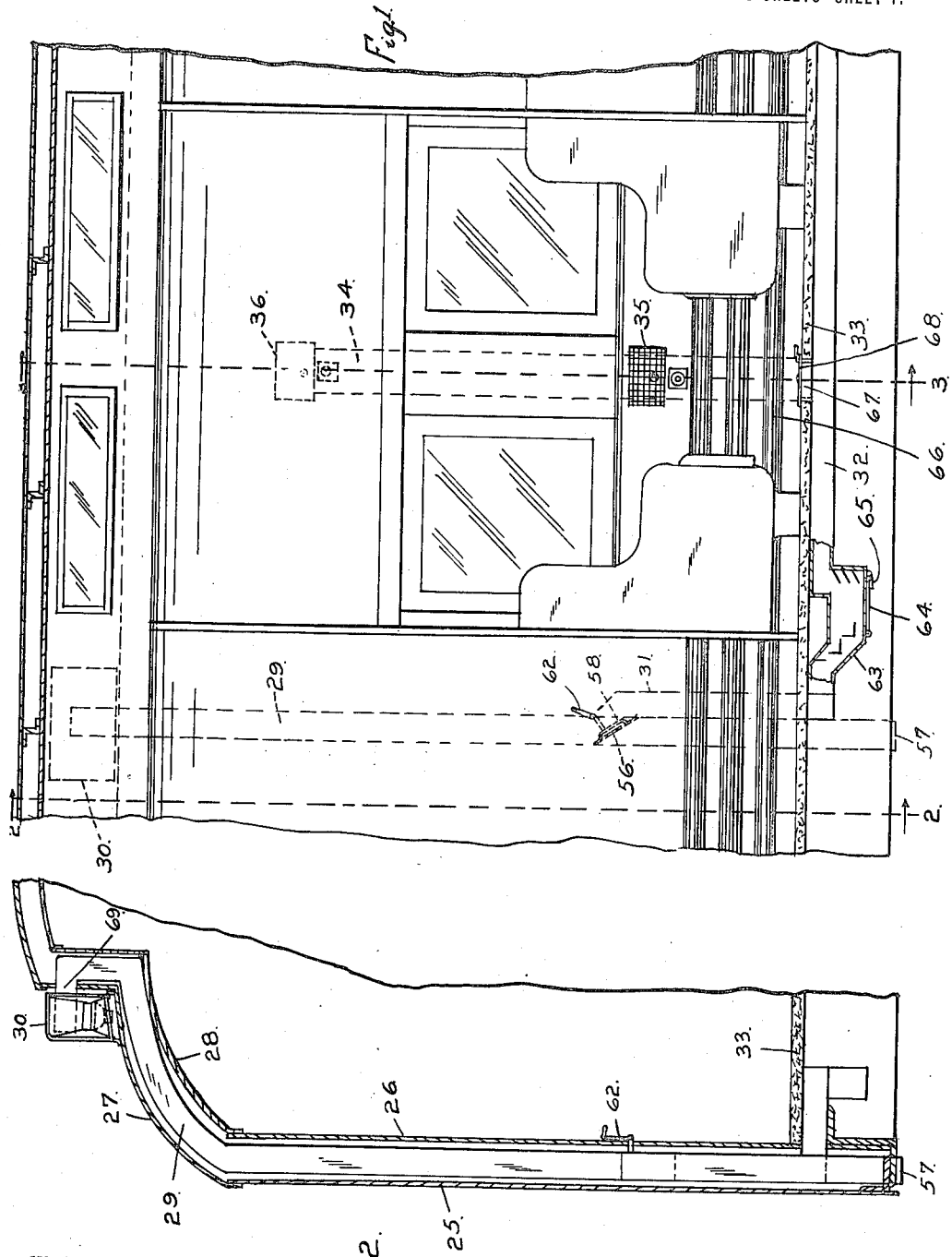

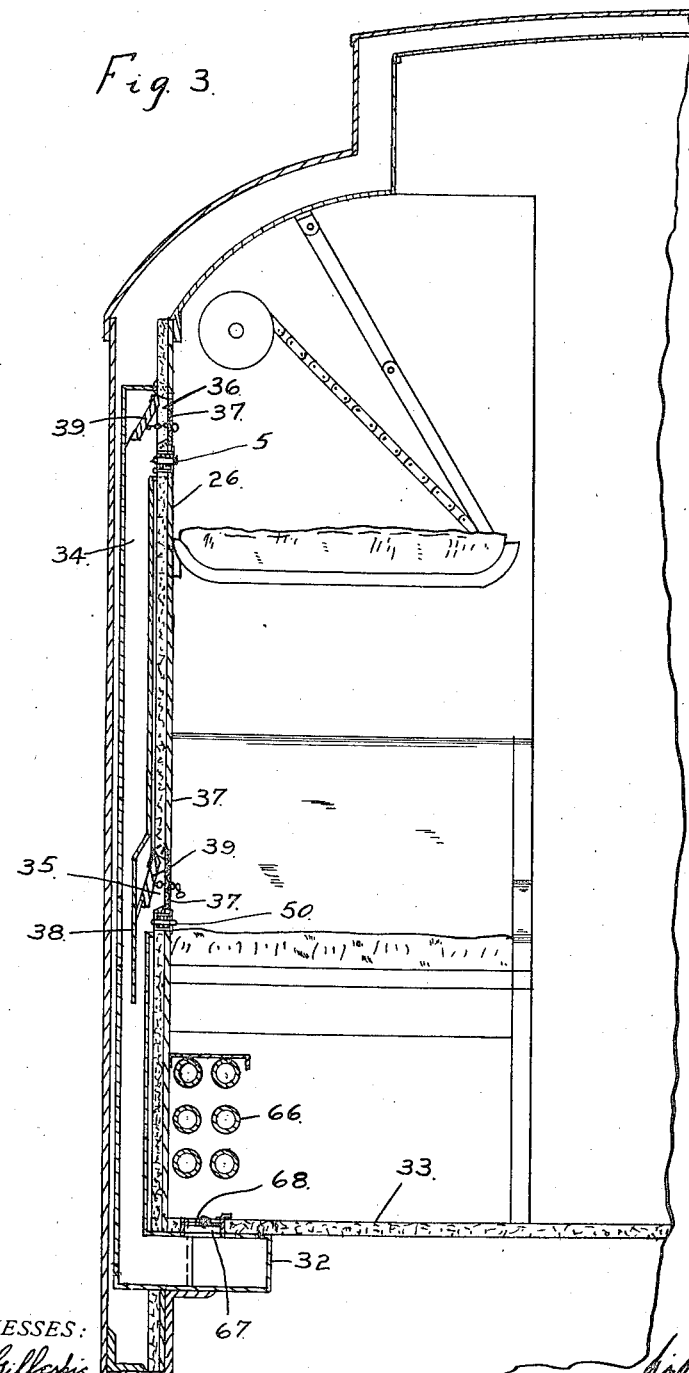

W. P. RUSSELL.
VENTILATING APPARATUS FOR SLEEPING CARS.
APPLICATION FILED MAY 29, 1913.
1,172,313.
Patented Feb. 22, 1916.
5 SHEETS—SHEET 4.
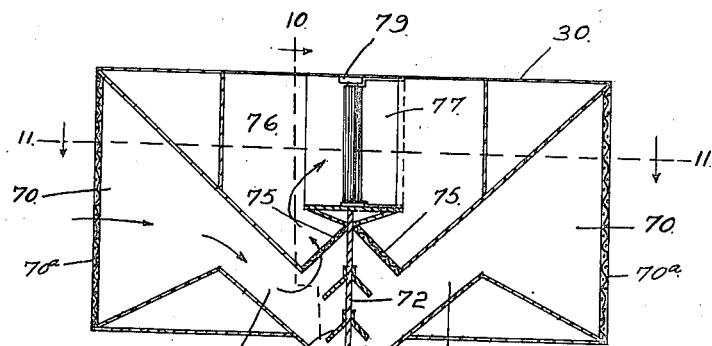
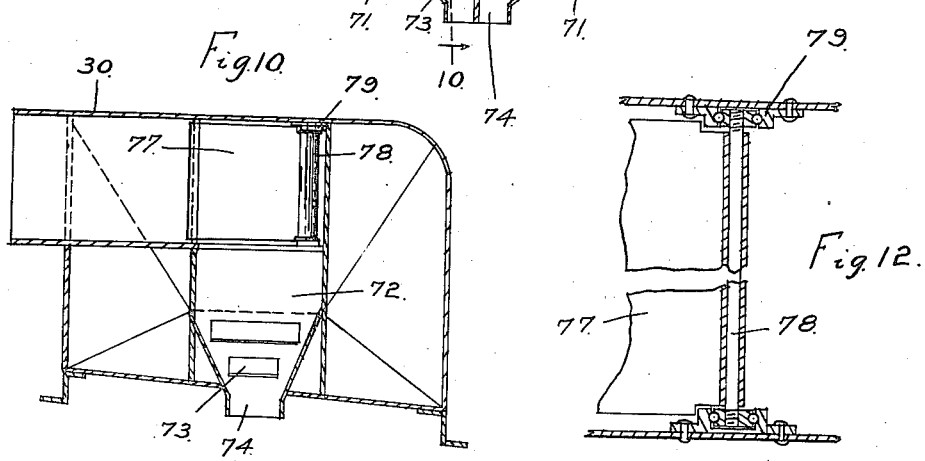
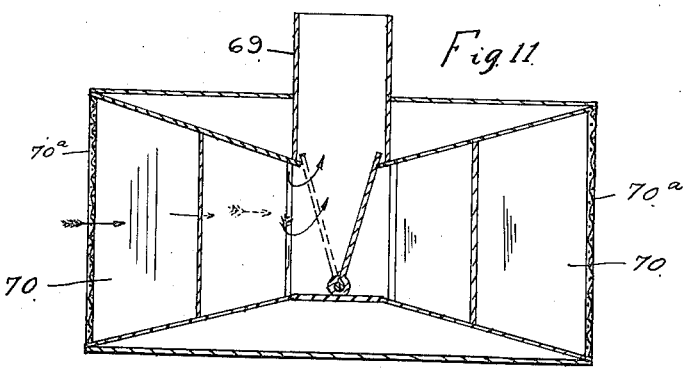
WITNESSES:
H. M. Gillespie
J. B. Lagoni
INVENTOR
William P. Russell
BY Barnett & Truman
ATTORNEYS

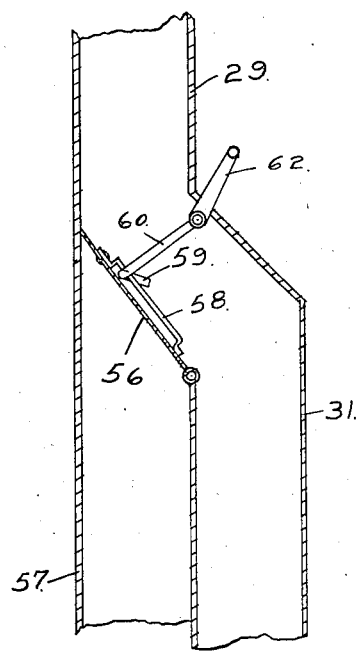
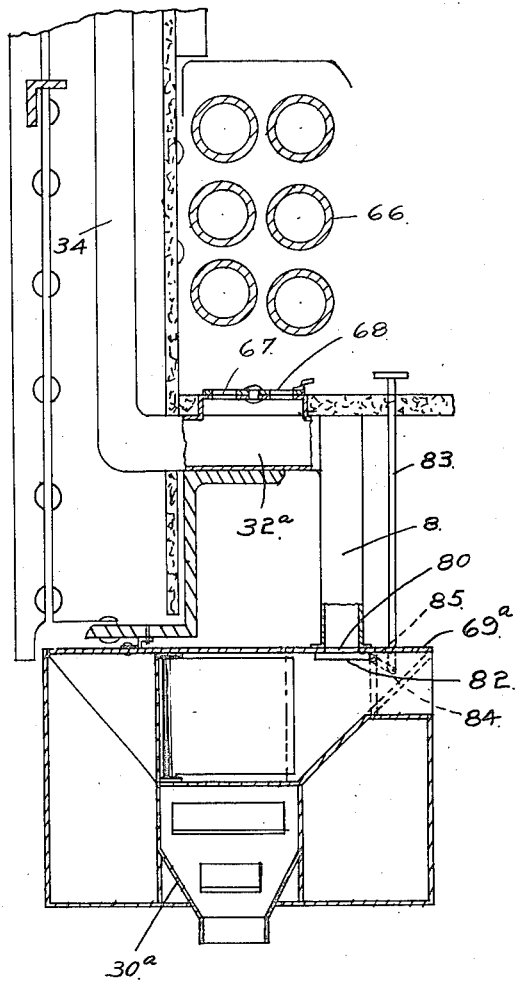
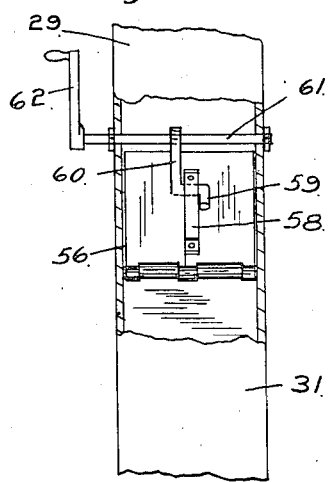

UNITED STATES PATENT OFFICE.

WILLIAM P. RUSSELL, OF CHICAGO, ILLINOIS.

VENTILATING APPARATUS FOR SLEEPING-CARS.

1,172,313.   Specification of Letters Patent.   Patented Feb. 22, 1916.

Application filed May 29, 1913. Serial No. 770,679.

*To all whom it may concern:*

Be it known that I, WILLIAM P. RUSSELL, a citizen of the United States, residing at Chicago, in the county of Cook and State of Illinois, have invented certain new and useful Improvements in Ventilating Apparatus for Sleeping-Cars, of which the following is a specification.

My invention relates to ventilating systems for railway cars.

A primary object is to provide a ventilating system suitable particularly for sleeping cars, which will serve to effectively supply fresh air to the berths of the car, both upper and lower, when made up, and which, so far as the ventilation of each berth is concerned, is controllable through conveniently operated devices by the occupant thereof.

A further object of the invention is to provide a ventilating system in which the outside air may be readily and conveniently cut off from the entire system by the attendant, if desired, for example, when the train passes through a tunnel.

A further object of the invention is to provide, in a ventilating system for railway cars, certain devices and arrangements for ridding the air entering the car of dust, cinders, and the like, for preventing the rain from entering the air ducts, and for insuring a constant supply of fresh, clean air at all times when the car is in motion.

The invention consists of certain novel and improved constructions for carrying out these objects, and further, such other novel and improved constructions, arrangements, devices and combinations of devices relating to the ventilation of railway cars and particularly to the ventilation of the berths of sleeping cars as are shown, described and claimed herein.

The system of my invention, while particularly suitable for supplying fresh air to sleeping cars may be used to advantage in any other type of railway passenger car.

The invention is illustrated, in a preferred embodiment, in the accompanying drawings, wherein—

Figure 1 is a fragmentary sectional elevation of a sleeping car equipped with the ventilating system of my invention; Fig. 2, a fragmentary cross sectional view, taken on line 2—2 of Fig. 1; Fig. 3, a cross sectional view, on an enlarged scale, taken through one of the sections of the car with the berths made up; Fig. 4, a view, in elevation, of a portion of the side wall of the car showing the screened opening through which fresh air is introduced into the berth and the devices for operating the valve controlling such opening; Fig. 5, a vertical sectional view taken on line 5—5 of Fig. 4; Fig. 6, a view, looking toward the inside of the valve, showing the construction of the two-part latch which holds the valve in closed position; Fig. 7, a vertical sectional view, on a larger scale than Fig. 5, taken through the lower edge of the valve, the adjacent portion of the inner sheathing of the wall and the mechanism for holding the valve in its closed position and releasing the same when desired; Fig. 8, a detail illustrating the construction of the spring hinge employed for hinging the valve to the inner wall sheathing; Fig. 9, a longitudinal sectional view of a preferred form of cowl for keeping the air ducts of the ventilating system supplied with fresh air; Fig. 10, a sectional view taken one line 10—10 of Fig. 9; Fig. 11, a sectional plan on line 11—11 of Fig. 9; Fig. 12, a detail sectional view showing the construction of the deflecting valve forming a part of the cowl; Fig. 13, a vertical sectional view taken through the intake duct to illustrate the construction and arrangement of the valve employed for cutting off the supply of air to the ventilating system when the car is going through a tunnel; Fig. 14, a fragmentary view, in elevation with parts in section, further illustrating the construction of this valve, and Fig. 15, a fragmentary vertical sectional view showing a modified arrangement in accordance with which the fresh air is taken into the air ducts through the bottom of the car instead of at the roof.

Like characters of reference designate like parts in the several figures of the drawings.

Referring to the drawings, 25 designates the outer sheathing of the side wall of a car, 26 the inner sheathing, 27 the outer sheathing of the deck of the car, and 28 the inner sheathing of the same. Extending through the space between the inner and outer sheathings is a pipe or duct 29 (referring to the preferred construction shown in the first fourteen figures of the drawings) which extends from top to bottom of the car, is open at the bottom, and at the top communicates with a fresh air cowl 30 arranged on the deck of the car.

The intake duct 29 communicates by means of a branch duct 31, with a main duct 32 which extends lengthwise of the car along one side thereof being preferably located immediately below the flooring 33. From the main duct lead, at suitable intervals, branch or riser ducts 34 which open into the car at suitable places. If the system is employed on a sleeping car one of the branch ducts 34 will preferably be located between each pair of seats and will have two openings 35, 36 covered preferably with screens 37, one of these openings arranged so that it delivers air into the lower berth, when the berths are made up, and the other into the upper berth. The branch duct in this case is preferably provided with a deflector plate 38 which extends downwardly from a point above the opening 35 to a point some distance below the same for the purpose of making a proper distribution of the air as between the upper and lower berths.

Valves 39 are provided for closing the openings 35, 36 which are preferably hinged at their upper edges to the inner sheathing 26 by spring hinges 40 (Fig. 8), the springs of which open the valves when the latter are released. I have shown each hinge provided with a pair of springs 41 coiled about the pintle 42 of the hinge, the latter extending through lugs 43 on the leaves. On the inside of the valve is a two-part spring-pressed latch, the parts of which 44 are pivoted on a stud 45 (Figs. 6 and 7), pressed by leaf springs 46 and formed at the bottom with notches 47 adapted to engage a stud 48 secured to the casing 49 of a push button 50. The latter, held in its inoperative position by a coil spring 51, has a pointed end 52 adapted to be thrust between the latch members 44, 44 so as to separate them and release their engagement with the stud 48. The latch members are retained by a keeper 53. The valve may be closed by a chain 54 which passes through a ring 55 set in the screen 37.

A hinged shut-off valve 56 is arranged at the junction of the duct 31 with the intake duct 29 (Figs. 13 and 14). In one position of this valve the air taken into the intake duct passes through duct 31 to the main duct 32. In the other position the air is shut off from duct 31 and directed out through the lower end 57 of the duct 29. By this means the ventilating system can be short circuited when the train passes through a tunnel. I have shown the valve 56 as being provided with a guide strip 58 engaged by a hook 59 on the end of a crank 60 fixed to a shaft 61 which is turned by a handle 62. The main duct 32 is preferably provided with an off-set portion 63 forming a cinder pocket. The bottom of this pocket is provided with a hinged door 64 held in place by a latch 65. By offsetting the main duct at a point in advance of the branch ducts 34 any dust and cinders that the air may carry are intercepted.

The main duct 32 is preferably arranged at the side of the car so as to be directly under the steam coils 66. Openings 67 are formed in the duct and through the flooring of the car at intervals through which air may be directed against the steam coils to cool the same when occasion requires. These openings are controlled by dampers 68. By this arrangement the steam coils may be quickly cooled down at night after the berths have been made up to avoid the overheating of lower berths which occurs so frequently.

The construction of my preferred form of intake cowl is shown in Figs. 9 to 12 inclusive. This device is formed with a passageway, preferably a zigzag passageway, extending through the same from end to end, that is, in a direction lengthwise of the car, which passageway communicates through a neck 69 with the upper end of the intake duct 29. The construction of the cowl so as to provide this zigzag passageway, the purpose of which is to prevent dust, cinders, rain, and the like from entering the intake duct, is as follows: Each end of the cowl is formed so as to provide a flared opening 70 across which is arranged a screen 70ª, leading to a downwardly inclined passageway 71. Here the incoming air meets a partition 72 preferably provided with the downwardly inclined deflector plates 73, is baffled and deposits any matter which it may carry in suspension through openings 74 in the bottom of the cowl. The air, which will enter the cowl at one end or the other according to the direction of travel of the car, is forced up through one of a pair of screens 75 into a space 76 in which is pivoted a deflecting valve 77, the pintle of which 78 is vertical and turns preferably in ball bearings 79 (Fig. 12). The pressure of the air against valve 77, when the train starts, moves the valve into a position to direct air entering the cowl into the intake duct 29 through neck 69. The valve is therefore self-adjusting.

In Fig. 15 I have shown a modified construction in which the cowl 30ª is arranged under the car instead of on the roof. The construction of the cowl is substantially the same as the one already described except that it has an opening 80 in the top through which the air passes into a pipe 81 which leads to the main duct 32ª. In the neck 69ª of the cowl is a hinged valve 82 which is adapted to close either the neck of the cowl, in case the ventilating system is operated, or the opening 80, when the system is out of operation. The valve 82 is operated by a pull rod 83 connected to an arm 84 on the pintle 85 of the valve.

While I have described my invention as embodied in certain preferred constructions it will be understood that modifications might be made therein without departure from the invention.

I claim:

1. The combination with a car having an air duct adapted to deliver air into the interior of the car, of a supply pipe extending from the top to the bottom of the car, open to the outside atmosphere at both ends and communicating with said duct, means at one end of said supply pipe for forcing air thereinto, and a deflecting valve at the intersection of said duct and pipe which in one position deflects air from the pipe into the duct and in the other position shuts off the duct from the pipe permitting the air to pass through the pipe from one end to the other.

2. The combination with a car having an air duct in the wall thereof which opens into the car at two places lengthwise thereof, means for forcing air into the duct at one end thereof, and a deflector plate arranged over the opening nearest the end of the duct into which the air is introduced which operates to divide the air supply, deflecting some of it into the opening adjacent the plate and allowing the remainder to pass to the other opening.

3. The combination with a car having an air duct in the wall thereof provided with an opening into the interior of the car, of means for introducing air into said duct, a screen covering said opening, a hinged valve for closing said opening which is located behind said screen and is within and opens backwardly into the duct, a spring which tends to hold said valve open, a catch releasable from inside the car for holding the valve closed, and means extending into the car for closing the valve.

4. The combination with a car having an air duct in the wall thereof provided with an opening into the interior of the car, of means for forcing air into said duct, a screen covering said opening, a hinged valve for closing said opening which is located within and opens backwardly into the duct, a spring which tends to hold said valve open, a pair of catch members pivoted on the valve, springs which tend to press said catch members together, means engaged by said catch members when the valve is in closed position, a push button arranged to be operated from within the car for separating said catch members to release the valve, and means extending into the car for closing said valve.

5. The combination with a railway car and radiator for heating same, of means providing an air duct disposed directly under said radiator, having branch ducts opening into the car, means for introducing air into said first-mentioned duct, said duct being provided with a port through which air may be delivered against the radiator to cool the same, and a valve to close said port.

WILLIAM P. RUSSELL.

Witnesses:
G. Y. SKINNER,
L. A. FALKENBERG.